A. CHAPMAN.
AUTOMOBILE BOOT.
APPLICATION FILED OCT. 6, 1919.
1,378,766. Patented May 17, 1921.
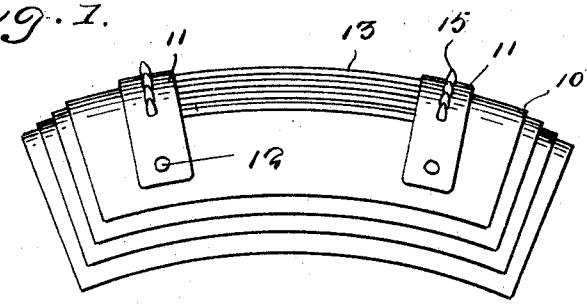
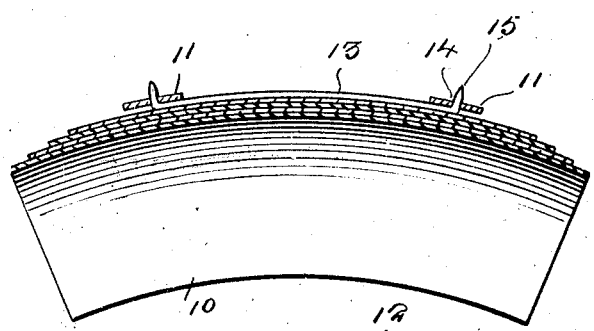
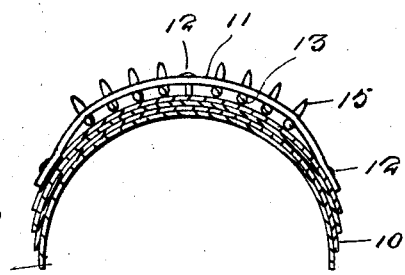
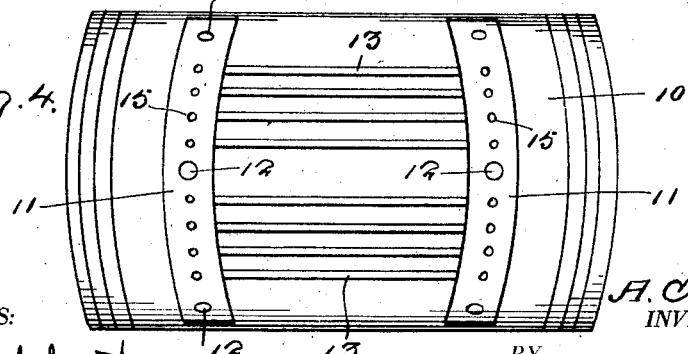

UNITED STATES PATENT OFFICE.

ALBERT CHAPMAN, OF KELLOGG, IDAHO, ASSIGNOR TO THE EAGLE CLAW TIRE BOOT COMPANY, OF KELLOGG, IDAHO, A CORPORATION OF IDAHO.

AUTOMOBILE-BOOT.

1,378,766.     Specification of Letters Patent.     Patented May 17, 1921.

Application filed October 6, 1919. Serial No. 328,663.

*To all whom it may concern:*

Be it known that I, ALBERT CHAPMAN, a citizen of the United States, residing at Kellogg, in the county of Shoshone and State of Idaho, have invented new and useful Improvements in Automobile-Boots, of which the following is a specification.

This invention relates to blow-out boots for pneumatic tires and has for an object the provision of a boot, which is adapted to be inserted within a tire casing and provided with means for holding the same in position in a manner to prevent creeping after the tire has been inflated.

Another object of the invention is the provision of means for holding the boot in position, which will, in addition, serve to strengthen and reinforce the boot.

Other objects and advantages of the invention will appear as the following description is read in connection with the accompanying drawings.

In the drawings:

Figure 1 is a side view of the boot per se.

Fig. 2 is a longitudinal sectional view of the same.

Fig. 3 is a transverse section through the boot taken on the center line of one of the metallic straps.

Fig. 4 is a plan view of the boot.

Referring to the drawings in detail, wherein like characters of reference denote corresponding parts, the boot comprises a body portion 10, which is preferably formed of a plurality of superimposed layers of fabric cemented together, the said layers decreasing in size, so that the side edges and end of the boot will be tapered in thickness. This boot is designed to be placed within the tire casing between the inner wall thereof and the inner tube, and is provided with novel means for holding the boot in position, so that it will remain over the injured part of the tire casing.

This means comprises a pair of metallic straps, one of which is located adjacent each end of the boot, as indicated at 11. These straps are secured in position by rivets or other fastening devices 12, which pass through one or more layers of the fabric of which the boot is formed. These fastening devices, however, do not extend entirely through the boot, so that they will not come in contact with the inner tube. Arranged longitudinally of the boot in spaced relation, is a plurality of reinforcing members, which are preferably in the form of wire 13. These wires have their ends bent substantially at right angles and pass through openings 14 formed in the straps 11. The extremities of the wires are preferably sharpened, so as to provide penetrating points 15, which are adapted to enter the tire casing to hold the tire in position.

It will be seen from the foregoing description and the accompanying drawings that the invention provides a light and comparatively thin boot, which may be inserted within the tire casing over the injured part of the tire and which is provided with combined reinforcing and securing means, so as to hold the boot in position.

The invention is susceptible of various changes in its form, proportions and minor details of construction and the right is herein reserved to make such changes as properly fall within the scope of the appended claim.

Having described the invention, what is claimed is:

A blow-out boot for pneumatic tires comprising a body portion, a transversely curved strap located at each end of the shoe and spaced longitudinally disposed wires connecting the straps and having their ends extending through openings in said straps and terminating in radially extending penetrating points for engagement with a tire casing to hold the boot in position.

In testimony whereof I affix my signature.

ALBERT CHAPMAN.